US011188540B2

(12) United States Patent
Bakulina et al.

(10) Patent No.: US 11,188,540 B2
(45) Date of Patent: Nov. 30, 2021

(54) FILTER AND JOIN OPERATIONS IN QUERY PROCESSING

(71) Applicant: SAP SE, Walldorf (DE)

(72) Inventors: Alena Bakulina, Mannheim (DE); Johannes Merx, Heidelberg (DE); Julian Schwing, Heidelberg (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 271 days.

(21) Appl. No.: 15/945,605

(22) Filed: Apr. 4, 2018

(65) Prior Publication Data
US 2019/0311059 A1    Oct. 10, 2019

(51) Int. Cl.
*G06F 16/2455*    (2019.01)
*G06F 16/22*    (2019.01)

(52) U.S. Cl.
CPC ...... *G06F 16/2456* (2019.01); *G06F 16/2282* (2019.01)

(58) Field of Classification Search
CPC .................. G06F 16/2456; G06F 16/2282
See application file for complete search history.

(56) References Cited

U.S. PATENT DOCUMENTS

| 2005/0091199 A1* | 4/2005 | Focazio | G06F 16/24537 |
| 2006/0136380 A1* | 6/2006 | Purcell | G06F 16/24553 |
| 2007/0061287 A1* | 3/2007 | Le | G06F 16/24539 |

OTHER PUBLICATIONS

SQLForum-2013: "mysql—Is it possible to rename a joined column during an inner join?—Stack Overflow", Oct. 12, 2013, available from <https://web.archive.org/web/20131012065431/https://stackoverflow.com/questions/5994485/is-it-possible-to-rename-a-joined-column-during-an-inner-join> (Year: 2013).*
SQLForum-2016: "sql—How to perform a join with aliases for two tables in oracle?—Stack Overflow", Apr. 1, 2016, available from <https://stackoverflow.com/questions/36364200/how-to-perform-a-join-with-aliases-for-two-tables-in-oracle> (Year: 2016).*
Drupal: "Drupal 8, Documentation—Dynamic Queries—Fields", Sep. 14, 2017, available from <https://www.drupal.org/docs/8/api/database-api/dynamic-queries/fields> (Year: 2017).*
DBJournal, "Disambiguating between Duplicate Column Names in MySQL", Sep. 21, 2010, accessible from <https://www.databasejournal.com/features/mysql/article.php/3904451/Disambiguating-between-Duplicate-Column-Names-in-MySQL.htm> (Year: 2010).*

* cited by examiner

*Primary Examiner* — Matthew Ell
*Assistant Examiner* — Anugeetha Kunjithapatham
(74) *Attorney, Agent, or Firm* — Mintz, Levin, Cohn, Ferris, Glovsky and Popeo, P.C.

(57) ABSTRACT

Described herein includes a calculation scenario of a calculation engine that efficiently filters and joins data for processing. The calculation engine enhances the performance of the join operations by allowing join inputs to be pre-filtered more effectively. Such join operations can allow for faster processing times, and a reduction in the amount of data to be joined, resulting in more efficient processing.

20 Claims, 6 Drawing Sheets

FILTER AND JOIN OPERATIONS IN QUERY PROCESSING

TECHNICAL FIELD

The subject matter described herein relates to various embodiments of a calculation engine that filters and joins data for efficient processing.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, etc. on a different system or systems than that on which a DBMS is executed.

Data held in a relational database can be accessed using structured query language (SQL) statements. A SQL statement can include commands for manipulating data in the relational database such as, for example, INSERT, SELECT, UPDATE, DELETE, and/or the like. Each command can be further associated with one or more clauses. In particular, a SQL JOIN clause can combine data from multiple database tables. As such, the inclusion of a SQL JOIN clause in a SQL statement can cause the corresponding command to be applied to data held in multiple database tables. For example, a SELECT command that is accompanied by a JOIN clause retrieves data from a combination of database tables in the relational database.

Dealing with large amounts of data can result in slow and cumbersome data processing. Calculation scenarios can include hierarchical join operations. A hierarchical join includes a plurality of join operations, each executed in a hierarchical manner, with one join operation serving as a root node, and the remaining join operations serving as child nodes. Each of the leaves in the hierarchical join can include data (e.g., from a database). When executed, the hierarchical join provides an intersection of a plurality of datasources. Calculation scenarios utilizing hierarchical joins can produce useful results (e.g., data tables). However, the generation and processing of hierarchical joins can require a large amount of computation time and result in unnecessary slowdown of the execution of queries. Thus, optimizations of hierarchical joins may be desired.

SUMMARY

Systems, methods, and articles of manufacture, including computer program products, are provided. In one aspect, a method may include receiving a query to filter a set of data by a calculation engine. The set of data can be stored in a first table and a second table. The first table may include a first attribute and a second attribute that is different from the first attribute. The second table may include the first attribute and the second attribute. The method may include joining the set of data contained in the first table and the second table on a join node. The join node can include the at least one programmable processor. The join node can include a first join key defining the first attribute and a second join key defining the second attribute. The joining may include determining that the first table and the second table include the first attribute and the second attribute. The joining may include replacing the first attribute of the first table with a third attribute that is different from the first and second attributes. The third attribute and the first attribute semantically may contain a same set of data. The joining may include pairing the third attribute with the first attribute and storing pairing information including the paired third attribute and first attribute on the join node. The joining may include providing a response to the query. Providing the response can include using the joined set of data.

In optional variations, one or more additional features, including but not limited to the following can be included in any feasible combination. For example, the joining may further include filtering the first table and the second table based on the first attribute using the pairing information stored on the join node. In some variations, the query specifies a filter to be applied to the set of data. In some variations, the first attribute can include one or more of a Product ID, an Order ID, a Customer ID, and a Customer Name, and the second attribute can include one or more of the Customer ID, the Customer Name, and a Customer Address. In some variations, the first attribute and the second attribute may be associated with separate columns of the first table and the second table. In some variations, the joining may further include receiving an instruction to handle the third attribute as the first attribute for filter purposes. The instruction can specify the third attribute. In some variations, the query further specifies at least the first join key and the second join key.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Calculation scenarios utilizing hierarchical joins can produce useful results. However, hierarchical joins can consume a significant amount of processing power, slowing down the execution of the calculation scenarios. The current subject matter is directed to processing calculation scenarios such that unnecessary operations or calculations within hierarchical joins are reduced and processing time is decreased.

Calculation scenarios in database systems, such as for the distributed HANA database systems, may use join operators to join inputs, such as tables, joined tables, or other data sources. The join operators can join the tables using a join key or several join keys. Larger modeled calculations scenarios may become more complex and require a large number of join keys. However, increasing the number of join keys can significantly increase the computational complexity of the join operation and can slow down processing. To optimize the calculation scenario, it can be beneficial to minimize the number of join keys.

In some situations, minimizing the number of join keys can lead to circumstances in which there are columns (e.g., attributes) in the join inputs that contain the same data and/or data that could have been used as additional join keys but were not. Accordingly, in some situations, while the join operation performance can benefit from such scenario design, filter performance may become less efficient. For example, if a filter is applied to one of the columns of the table, the filter may only be pushed down to one of the join inputs to prefilter the data before the join operator completed the operations. The data in the other input that is being joined may be the same as the first join input. In such situations, the data in the other input may have been able to be filtered out under the same conditions to reduce the amount of data to be joined and/or decrease the computational complexity.

For example, typical systems may not be able to recognize that the data in each of the join inputs overlap. Generally, only join keys may have the same name in both inputs and on the join node itself. In such situations, additional join fields must be named differently in the join node inputs, even if the join fields semantically contain the same data. Typical models may not include information or other instructions that can be used to filter the data if attributes (e.g., column names or labels) are different. Join operations according to implementations of the current subject matter can desirably provide for additional join fields to optimize the filter performance when attributes are different but semantically contain the same data.

Figure 1:
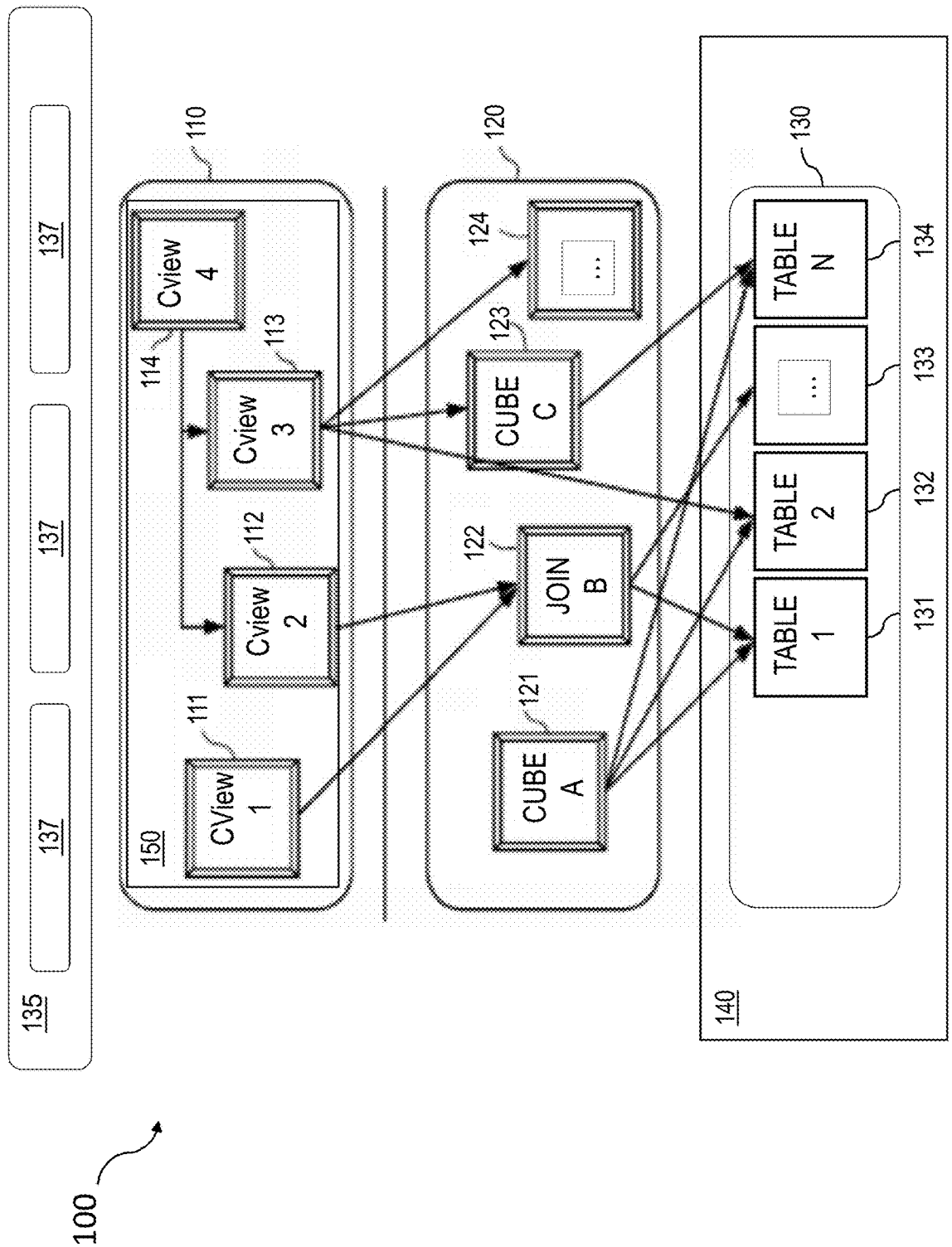
FIG. 1 shows a diagram illustrating a computing architecture consistent with implementations of the current subject matter including a database system that includes three layers: a calculation engine layer, a logical layer, and a physical table-pool.

FIG. 1 is a diagram that illustrates a computing architecture 100 including a database system that includes three layers: a calculation engine layer 110, a logical layer 120, and a physical table-pool 130. One or more application servers 135 implementing database client applications 137 can access the database system. Calculation scenarios can be executed by a calculation engine, which can form part of a database or which can be part of the calculation engine layer 110 (which is associated with the database). The calculation engine layer 110 can be based on and/or interact with the other two layers, the logical layer 120 and the physical table pool 130. The basis of the physical table pool 130 consists of physical tables (called indexes) containing the data, which can be stored on one more database servers 140. Various tables 131-134 can be joined using logical metamodels 121-124 defined by the logical layer 120 to form an index. For example, the tables 131-334 in a cube (e.g. an online analytical processing or "OLAP" index) can be assigned roles (e.g., fact or dimension tables) and joined to form a star schema. It is also possible to form join indexes (e.g. join index B 122 in FIG. 1), which can act like database views in computing environments such as the Fast Search Infrastructure (FSI) available from SAP SE of Walldorf, Germany.

As stated above, a calculation scenario 150 can include individual nodes (e.g. calculation nodes) 111-114, which in turn each define operations such as joining various physical or logical indexes and other calculation nodes (e.g., CView 4 is a join of CView 2 and CView 3). That is, the input for a node 111-114 can be one or more physical, join, or OLAP indexes or calculation nodes.

In a calculation scenario 150, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150.

Every calculation scenario 150 can be uniquely identifiable by a name (e.g., the calculation scenario 150 can be a database object with a unique identifier, etc.). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
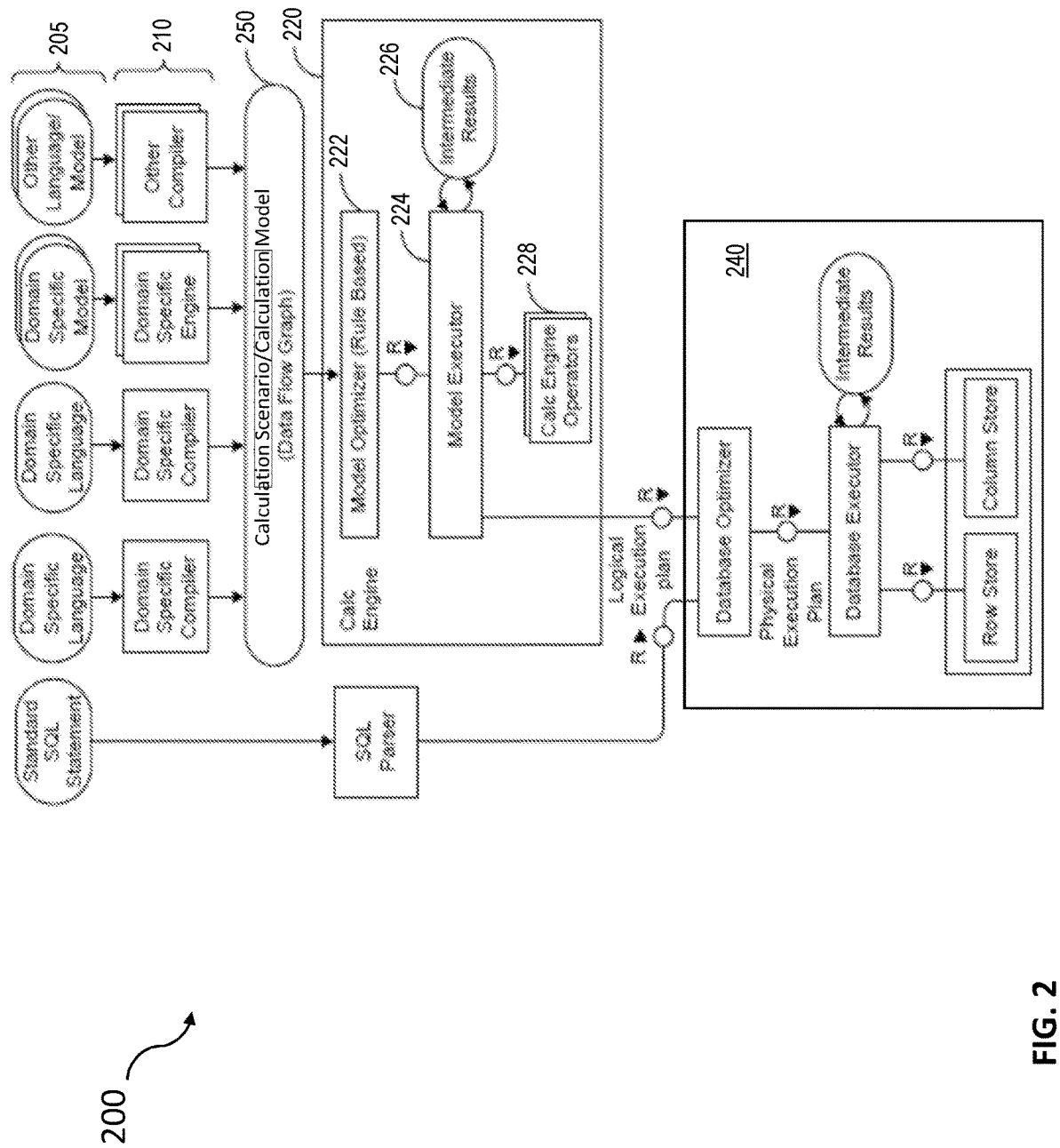
FIG. 2 shows a diagram illustrating a sample architecture for request processing and execution control consistent with implementations of the current subject matter.

FIG. 2 is a diagram 200 illustrating a sample architecture for request processing and execution control. As shown in FIG. 2, artifacts 205 in different domain specific languages can be translated by their specific compilers 210 into a common representation called a "calculation scenario" 250 (which is also referred to in in FIG. 2 as a calculation model). To achieve enhanced performance, the models and programs written in these languages are executed inside the database server 240. This arrangement eliminates the need to transfer large amounts of data between the database server 240 and a client application (e.g., the client application 137), which can be executed by an application server (e.g., the application server 135). Once the different artifacts 205 are compiled into this calculation scenario, they can be processed and executed in the same manner. A calculation engine 220 executes the calculation scenarios 250.

A calculation scenario 250 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 137) at the application server 135). Inputs can be connected to tables or to the outputs of other nodes. A calculation scenario 250 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 250 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 250 can be defined as part of database metadata and invoked multiple times. A calculation view can be created, for example, by a SQL statement "CREATE COLUMN VIEW <schema>.<viewName> TYPE CALCULATION WITH PARAMETERS". Once a calculation view is created it can be queried (e.g., "SELECT FROM <calcview name>", etc.). In some cases, databases can have pre-defined calculation scenarios 250 (default, previously defined by users, etc.). Calculation scenarios 250 can be persisted in a repository (coupled to the database server 240) or in transient scenarios. Calculation scenarios 250 can also be kept in-memory.

Calculation scenarios 250 are more powerful than traditional SQL queries or SQL views for many reasons. One reason is the possibility to define parameterized calculation schemas that are specialized when the actual query is issued. Unlike a SQL view, a calculation scenario 250 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 250 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and the like supplied with the invocation to instantiate a query specific calculation scenario 250. This instantiated calculation scenario 250 is optimized for the actual query and does not contain attributes, nodes or data flows that are not needed for the specific invocation.

When the calculation engine 220 gets a request to execute a calculation scenario 250, it can first optimize the calculation scenario 250 using a rule based model optimizer 222. Examples for optimizations performed by the model optimizer can include "pushing down" filters and projections so that intermediate results 226 are narrowed down earlier, or the combination of multiple aggregation and join operations into one node. The optimized model can then be executed by a calculation engine model executor 224 (a similar or the same model executor can be used by the database directly in some cases). This includes decisions about parallel execution of operations in the calculation scenario 250. The model executor 224 can invoke the required operators (using, for example, a calculation engine operators module 228) and manage intermediate results. Most of the operators are executed directly in the calculation engine 220 (e.g., creating the union of several intermediate results). The remaining nodes of the calculation scenario 250 (not implemented in the calculation engine 220) can be transformed by the model executor 224 into a set of logical database execution plans. Multiple set operation nodes can be combined into one logical database execution plan if possible.

The calculation scenarios 250 of the calculation engine 220 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 220 to execute the calculation scenario 250 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

Figure 3:
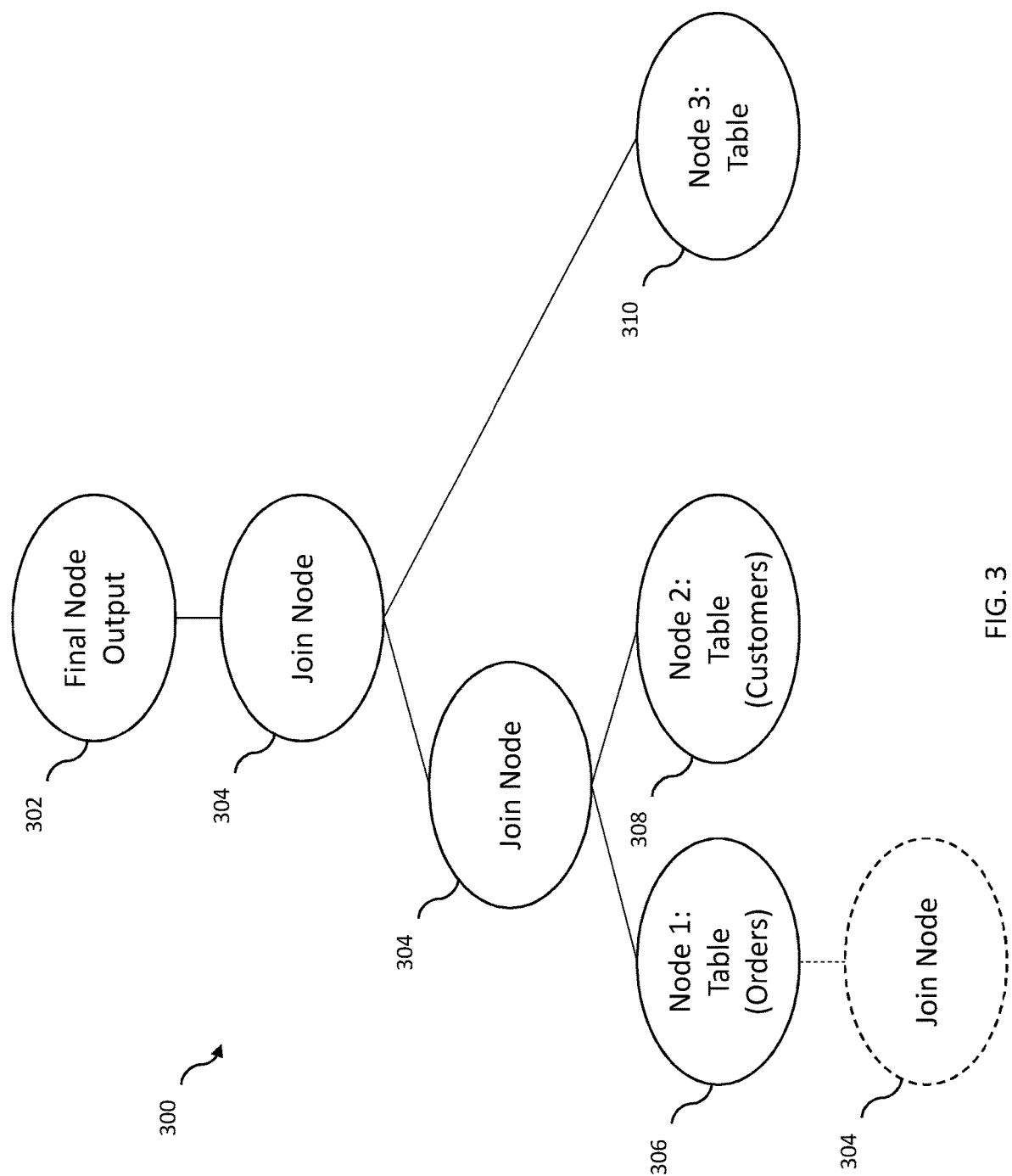
FIG. 3 shows a diagram illustrating an embodiment of a calculation scenario at design time including a join node and at least two table nodes.

FIG. 3 illustrates a diagram showing a model of a calculation scenario 300. The calculation scenario 300 can include at least one join node 304. The join node 304 can include a calculation and/or processing node that includes computer hardware, such as at least one programmable processor. A join may be defined as the combination of two or more sources. Whenever more than two sources are joined, more than one join operation may be necessary. For example, the illustrated hierarchical join provides a mechanism for joining more than two sources, one join at a time, to provide a final node output 302 (which can include filtered data). In various implementations, a join includes an intersection of two or more data sources. The results of the intersection can vary based on the type of join utilized. As examples, a join can cross joins, inner joins, outer joins, star joins, etc.

As illustrated, each join includes a "left part" and a "right part" which are the two child nodes of their respective parent or root node (e.g., of the join node). The left part and the right part may comprise the data sources from which the intersection of a join operation is formed. For example, one or more of the joins 304 in the hierarchical join may be a join of two separate joins. Although each of the joins 304 are represented as the intersection of two nodes, any one of the joins may be defined as the intersection of more than two nodes. In some aspects, the computation of each join 304 may be required before a preceding join can be computed. Accordingly, the time and computational resources necessary to calculate the result of a hierarchical join can be large, and may also slow down or delay the execution of other operations or processes. As such, optimizations of the calculation scenario 300 comprising a hierarchical join may be desirable.

According to aspects of the current subject matter, the calculation engine can execute the calculation scenario to enhance performance of join operations by allowing for join inputs, such as datasource operator or tables at table nodes 306, 308, 310. As described below, certain queries and structures can help to provide the calculation engine with information about similar columns in the tables having the same and/or different attributes and semantically the same data. The information can be used by the calculation engine to effectively push down a filter on one column to each column that has semantically the same data in two different tables. Such configurations can help to reduce the amount of data to be joined. This can help to increase processing speeds and/or reduce needed computational power.

The number and type of operations included in the calculation scenario can vary. For example, some operations, including calculation operations, can include joins and unions. Furthermore, the number and type of flags or indicators used to identify joining of data within a calculation scenario can vary and are not limited to the examples disclosed herein. For example, a flag can include specific directions for joining more than one table and creating a view of the joined tables.

Figure 4:
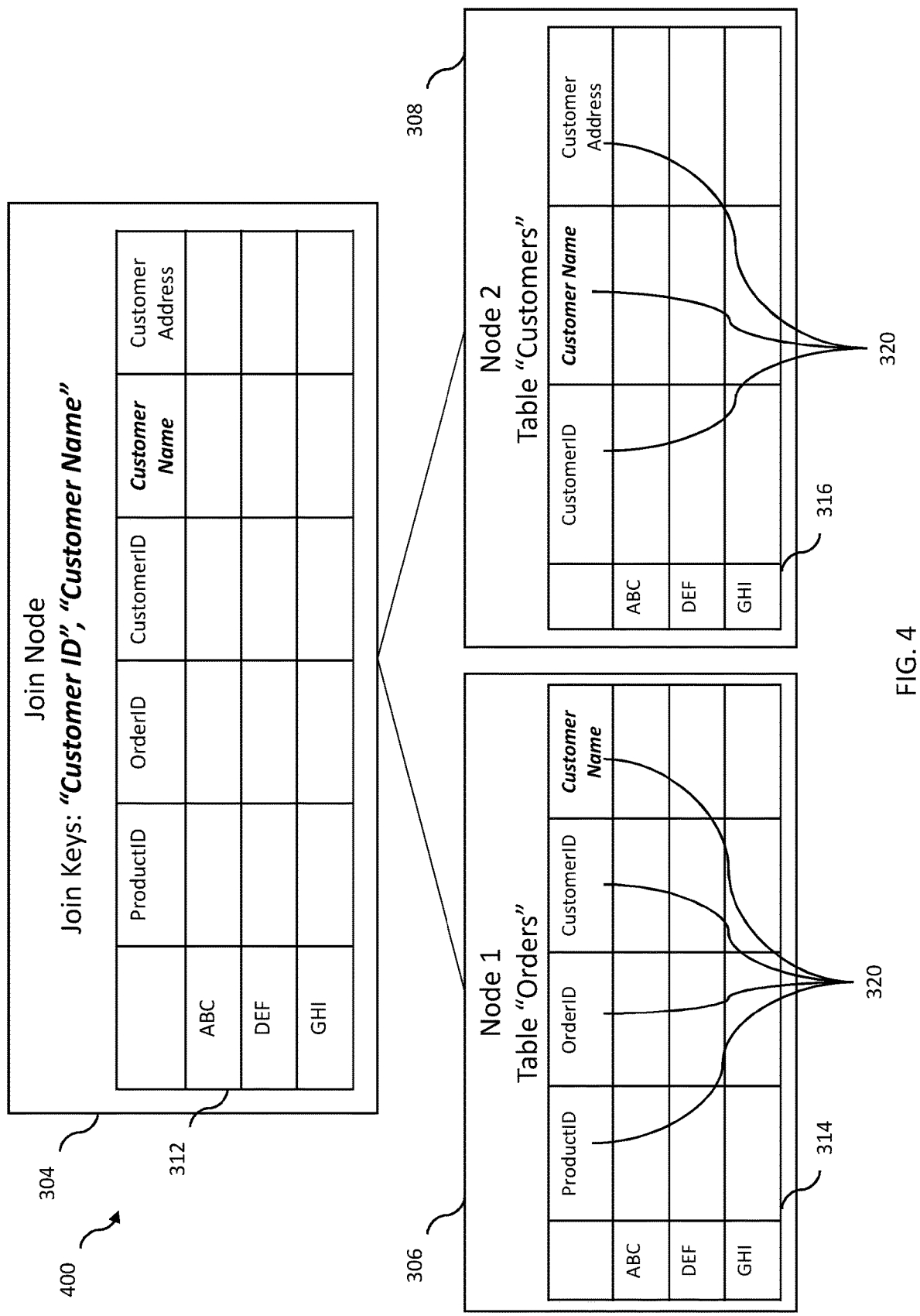
FIG. 4 shows an embodiment of a runtime scenario of the calculation scenario shown in FIG. 3 including the joining of two table consistent with implementations of the current subject matter.

FIG. 4 shows an example diagram illustrating an embodiment of at least a section 400 of a join of the calculation scenario 300 shown in FIG. 3. The subsection 400 can be implemented to illustrate the semantic attribute mapping model according to implementations of the current subject matter.

As shown in FIG. 4, the calculation scenario 300 can include a join node 304. The join node can include one or more join keys. The join keys can refer to an attribute (e.g., a column) of data which is common between two joined data sources, and upon which the resulting intersection is defined. For example, the join keys can include customer ID and/or customer Name, among others. In some implementations, the join keys can include, but is not limited to, one or more of a customer ID, a customer name, a product ID, an order ID, and/or a customer address. The join node 304 illustrates an example table 312. The table 312 illustrates an example of the joined table nodes.

The calculation scenario 300 can include one or more datasource operators or tables to be joined at the join node 304. For example, the calculation scenario 300 can include a first table node 306 and a second table node 308. The first table node 306 can include a first table 314 and the second table node 308 can include a second table 316. In the example illustrated in FIG. 4, the first table 314 includes data relating to "orders" and the second table 316 includes data relating to "customers".

The tables 314, 316 can include a plurality of rows and columns. Each of the rows can define a datasource. Each of the columns can represent an attribute. The data in each of the tables can be sorted by one or more of the attributes. In some implementations, some of the columns can represent attributes and some of the columns can represent a set of data. As shown in FIG. 4, the first table 314 of the first table node 306 can include a first attribute (ProductID), a second attribute (OrderID), a third attribute (CustomerID), and a fourth attribute (Customer Name). The second table 316 of the second table node 308 can include a first attribute (CustomerID), a second attribute (Customer Name), a third attribute (Customer Address). Other combinations and configurations are contemplated. In some implementations, the join keys can reference one or more of the attributes to join the first table 314 of the first table node 306 and the second table 316 of the second table node 308.

Figure 5:
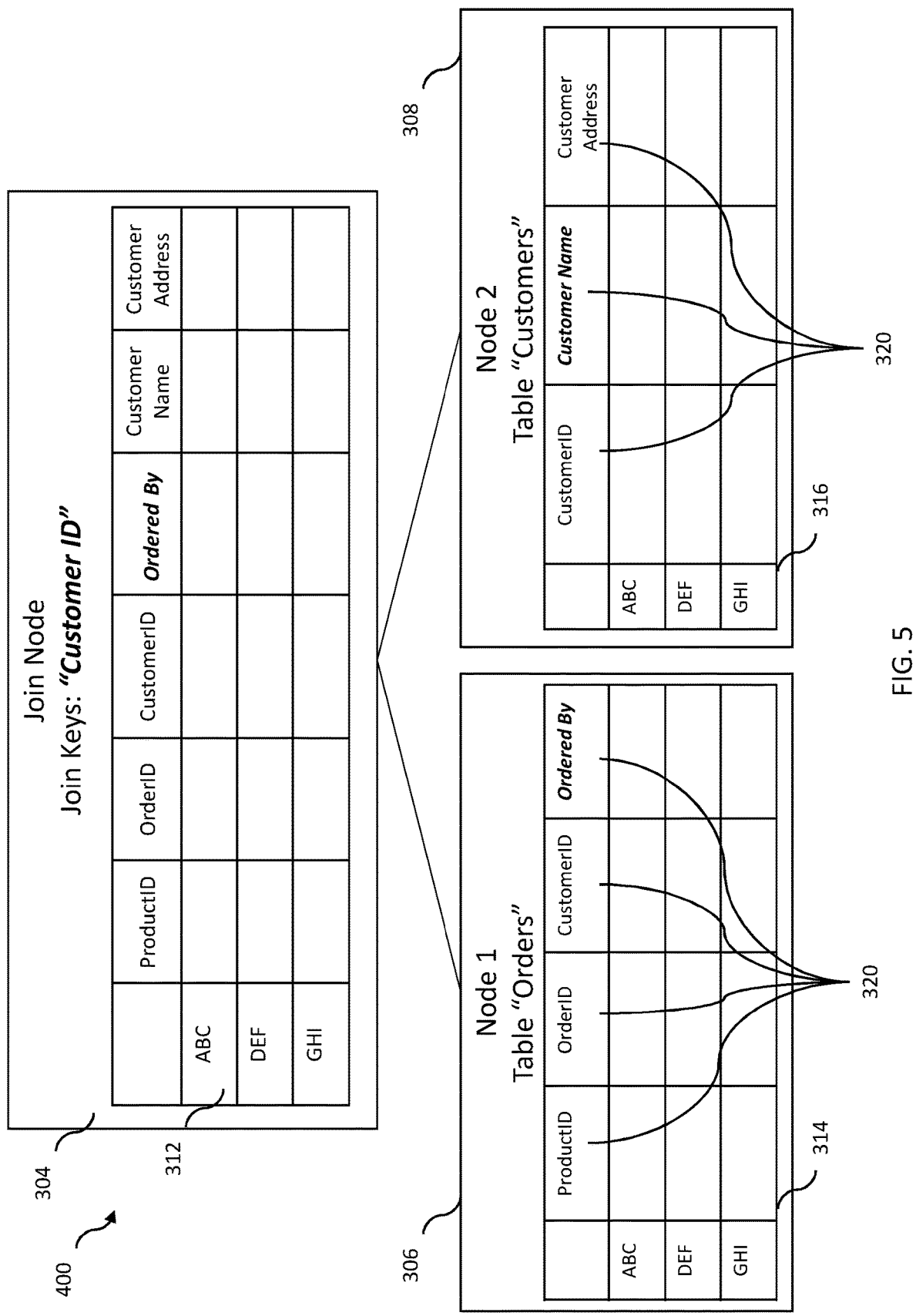
FIG. 5 shows an embodiment of a runtime scenario of the calculation scenario shown in FIG. 3 including the joining of two tables consistent with implementations of the current subject matter.

FIG. 5 illustrates an example calculation scenario 300 in which the join node 304 includes a join key "Customer ID" and at least one of the attributes of the first table 314 of the first table node 306 has been changed, such as from "Customer Name" to "Ordered By". The calculation scenario 300 shown in FIG. 5 is discussed in more detail below.

Figure 6:
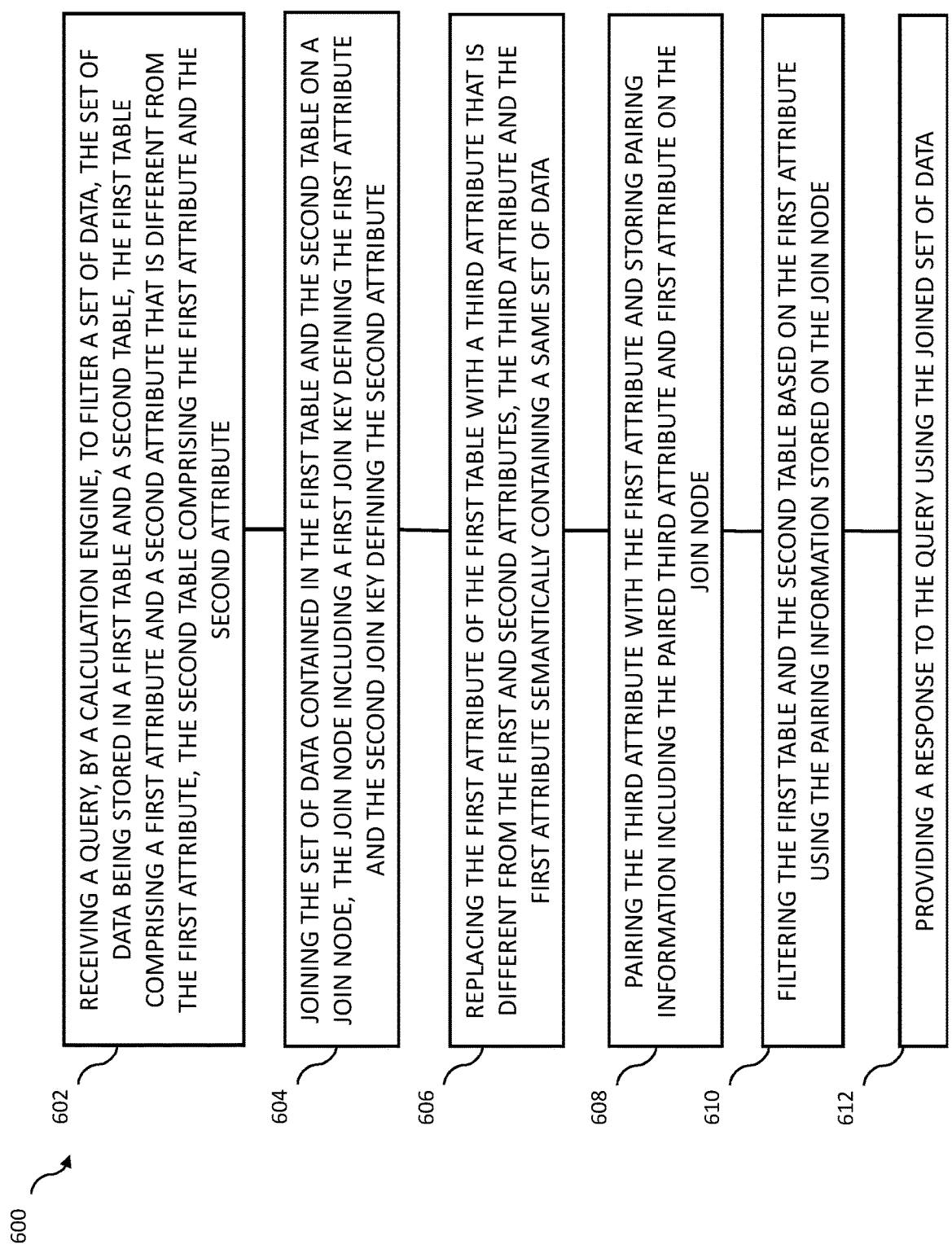
FIG. 6 shows a process flow diagram illustrating aspects of a method having one or more features consistent with implementations of the current subject matter.

FIG. 6 shows a process flow chart 600 illustrating features of a method consistent with one or more implementations of the current subject matter. It will be understood that other implementations may include or exclude certain features.

At 602, a calculation engine of a database management system can receive a query to join and/or filter a set of data. In some implementations, the calculation engine executes a calculation scenario according to the query. The set of data can be stored in the first table 314 and the second table 316. The first table 314 can include at least a first attribute and/or a second attribute, and the second table 316 can include at least the first attribute and/or the second attribute. An example of the query can include:
SELECT "Attribute 1", "Attribute 2", "Attribute 3" WHERE "Attribute 2='filter'

Based on the example shown in FIGS. 4 and 5, an example of the query can include:
SELECT "ProductID", "Customer Name", "Customer Address" WHERE "Customer Name"='ABC'

In some implementations, the query can specify at least one filter. The filter can be used to sort and/or filter each input table before the input tables are joined on the join node. In some implementations, the query can specify at least one join key, such as a first join key and/or a second join key, or more join keys. As mentioned above, the join keys can refer to or define an attribute (e.g., a column) of data which is common between two joined data sources, and upon which the resulting intersection is defined.

As shown in FIG. 4, the first join key can refer to "Customer Name" and the second join key can refer to "CustomerID". The first and second tables 314, 316 include attributes that match the first join key and the second join key. For example, the first and second tables 314, 316 have columns including data relating to two different attributes, such as the Customer Name attribute and the CustomerID attribute. As a result, both of the input tables may have columns having the same name.

At 604, the set of data contained in the first table and the second table can be joined by the calculation engine on a join node (such as the join node 304). The join node can include the first join key and/or the second join key. The first join key can define the first attribute. The second join key can define the second attribute.

The calculation engine can determine that the first table and the second table include the first attribute and the second attribute. Generally, joining with two join keys can be ineffective and/or inefficient. For example, joining using the join key CustomerID or Customer Name would achieve the same join result since each of the first table and the second table include attributes matching with both join keys. Such configurations can slow down processing speed and/or create other inefficiencies.

To speed up processing of the set of data and to join the first and second tables more efficiently, one of the join keys can be removed. For example, one of the join keys that corresponds to matching attributes that are contained in both of the first and second tables can be removed. In the example shown in FIGS. 4 and 5, since the join key "Customer Name" corresponds to matching "Customer Name" attributes that are contained in both of the first table 314 and the second table 316, the "Customer Name" join key can be removed. In some implementations, the "CustomerID" join key can be removed instead of the "Customer Name" join key in this example.

In some implementations, the join node 304 may not allow for input tables to be joined that have matching attributes that do not correspond to one of the join keys. Since one of the join keys has been removed, the matching attribute that corresponded to the removed join key can be replaced. In some implementations, a node can receive an instruction to handle the third attribute as the first attribute for filter purposes. The instruction can specify the third attribute.

For example, at 606, the first attribute of the first and/or second tables can be handled as a third attribute. The third attribute can be different from the first attribute and/or the second attribute. FIG. 5 illustrates the subsection 400 of the calculation scenario 300 in which the first attribute (e.g., Customer Name) has been replaced with and/or handled as the third attribute (e.g., Ordered By) that is different from the first attribute and the second attribute (e.g., CustomerID). Though the first attribute has been replaced with and/or handled as the third attribute in the first table, the first and third attributes may still semantically contain the same set of data. In some implementations, one or more fields of the first attribute may remain the same.

In some implementations, replacing the first attribute with the third attribute can allow the calculation scenario to be executed properly. Typically, replacing the first attribute with the third attribute may cause some data not to be filtered properly when the first table and the second table are joined at the join node. Without further information, the calculation engine at the join node may not be able to recognize that the first attribute and the third attribute semantically contain the same set of data, slowing down processing speeds. For example, the filter specified by the query may be pushed down in the calculation scenario model from an upper request node to one of the join nodes 304. At the join node 304, the filter may be pushed down only to one of the tables that has the matching attribute. In some implementations, if the filter "Customer Name" is applied after the third attribute (e.g., "Ordered By") has replaced and/or handled as the first attribute (e.g., "Customer Name") in the first table, the filter may be pushed down only to the second table wherein the filter matches the first attribute of the second table. In such configurations, at least a portion of the first table may not be sorted by the filter since the calculation engine would not recognize that the third attribute and the first attribute semantically contain the same data. Such configurations can undesirably reduce performance and/or slow down processing, as more data must be joined and/or processed.

Some implementations of the current subject matter can allow for the calculation engine to recognize that the first and third attribute semantically contain the same set of data. At 608, the calculation engine can pair the third attribute with the first attribute and/or store the pairing information (which includes the first attribute and the second attribute) on the join node. In some implementations, the calculation engine can include a SemanticAttributeMappings structure on the join node. The SemanticAttributeMappings structure can contain pairing information, such as the attributes and/or columns of each input table are related. The pairing information can refer to the attributes that semantically contain the same data. Since the paired attributes semantically contain the same data, the paired attributes could be used to join the first and second tables at the join node. In some implementations, the paired attributes include the first attribute and the third attribute. As mentioned above, the first and third attributes can be contained in different input tables, such as the second table and the first table, respectively. In some implementations, the SemanticAttributeMappings structure can include the following example input:

SemanticAttributeMappings=[["Attr1", "Attr3"], ["Attr2", "Attr4"], . . . ]

As shown above, the SemanticAttributeMappings structure can store the paired attributes, such as the paired first attribute and the third attribute. In some implementations, such as in the example shown in FIGS. 4 and 5, the SemanticAttributeMappings structure can include the following example input, in which the Customer Name attribute and the Ordered By attribute are paired:

SemanticAttributeMappings=[["Customer Name", "Ordered By"], ["Attr2", "Attr4"], . . . ]

At 610, the joining of the set of data stored in the first table and the second table can include filtering the first table and the second table based on the first attribute using the pairing information stored on the join node. For example, the calculation engine can read the pairing information stored in the SemanticAttributeMappings structure on the join node for all filter push down patterns. In some implementations, if there is a filter for a first attribute from a pair (e.g., "Attr1"), the same filter can be created where the first attribute is replaced with and/or handled as the third attribute (e.g., "Attr3"). The new filter may be pushed down to the corresponding input. Such configurations can desirably reduce the amount of data to be joined. This can help to increase processing speeds and/or decrease required computational power.

At 612, in some implementations, a response to the query can be provided using the joined set of data. The response to the query can be provided after any of steps 602, 604, 606, 608 and/or 610, among other steps.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
at least one programmable processor; and
machine-readable memory storing instructions, which when executed by the at least one processor, cause the at least one programmable processor to perform operations comprising:
receiving, by a calculation engine, a query to filter a set of data, the set of data being stored in a first table and a second table, the first table comprising a first attribute and a second attribute that is different from the first attribute, the second table comprising the first attribute and the second attribute, the first attribute of the first table corresponding to a first column, the first attribute of the second table corresponding to a second column; and
joining the set of data contained in the first table and the second table on a join node comprising the at least one programmable processor, the join node comprising a plurality of join keys, the plurality of join keys comprising a first join key defining the first attribute and a second join key defining the second attribute, the joining comprising:
determining that the first table and the second table each include the first attribute and the second attribute;
determining that the first column of the first table and the second column of the second table each semantically contain a same set of data;
removing, based on the determination that the first table and the second table each include the first attribute and the second attribute and the determination that the first column of the first table and the second column of the second table each semantically contain the same set of data, the first join key from the join node, thereby reducing a total number of join keys of the plurality of join keys;
selecting, between the first attribute and the second attribute and based on the removal of the first join key from the join node, the first attribute for replacement;
replacing the first attribute corresponding to the first column of the first table with a third attribute that is different from each of the first attribute and the second attribute; and pairing the third attribute with the first attribute and storing pairing information comprising the paired third attribute and the first attribute on the join node; and providing a response to the query, the providing comprising using the joined set of data, the joined set of data comprising: the first column with the third attribute; and the second column with the first attribute, the first column and the second column semantically containing the same set of data.

2. The system of claim 1, wherein the joining further comprises filtering the first table and the second table based on the first attribute using the pairing information stored on the join node.

3. The system of claim 1, wherein the query specifies a filter to be applied to the set of data.

4. The system of claim 1, wherein the first attribute comprises one or more of a Product ID, an Order ID, a Customer ID, and a Customer Name, and the second attribute comprises one or more of the Customer ID, the Customer Name, and a Customer Address.

5. The system of claim 1, wherein the first attribute and the second attribute are associated with separate columns of the first table and the second table.

6. The system of claim 1, wherein the joining further comprises receiving an instruction to handle the third attribute as the first attribute for filter purposes, the instruction specifying the third attribute.

7. The system of claim 1, wherein the query further specifies at least the first join key and the second join key.

8. A computer-implemented method, comprising:

receiving, by a calculation engine, a query to filter a set of data, the set of data being stored in a first table and a second table, the first table comprising a first attribute and a second attribute that is different from the first attribute, the second table comprising the first attribute and the second attribute, the first attribute of the first table corresponding to a first column, the first attribute of the second table corresponding to a second column; and joining the set of data contained in the first table and the second table on a join node comprising the at least one programmable processor, the join node comprising a plurality of join keys, the plurality of join keys comprising a first join key defining the first attribute and a second join key defining the second attribute, the joining comprising:

determining that the first table and the second table each include the first attribute and the second attribute;

determining that the first column of the first table and the second column of the second table each semantically contain a same set of data;

removing, based on the determination that the first table and the second table each include the first attribute and the second attribute and the determination that the first column of the first table and the second column of the second table each semantically contain the same set of data, the first join key from the join node, thereby reducing a total number of join keys of the plurality of join keys;

selecting, between the first attribute and the second attribute and based on the removal of the first join key from the join node, the first attribute for replacement;

replacing the first attribute corresponding to the first column of the first table with a third attribute that is different from each of the first attribute and the second attribute; and pairing the third attribute with the first attribute and storing pairing information comprising the paired third attribute and the first attribute on the join node; and providing a response to the query, the providing comprising using the joined set of data, the joined set of data comprising: the first column with the third attribute; and the second column with the first attribute, the first column and the second column semantically containing the same set of data.

9. The method of claim 8, wherein the joining further comprises filtering the first table and the second table based on the first attribute using the pairing information stored on the join node.

10. The method of claim 8, wherein the query specifies a filter to be applied to the set of data.

11. The method of claim 8, wherein first attribute comprises one or more of a Product ID, an Order ID, a Customer ID, and a Customer Name, and the second attribute comprises one or more of the Customer ID, the Customer Name, and a Customer Address.

12. The method of claim 8, wherein the first attribute and the second attribute are associated with separate columns of the first table and the second table.

13. The method of claim 8, wherein the joining further comprises receiving an instruction to handle the third attribute as the first attribute for filter purposes, the instruction specifying the third attribute.

14. The method of claim 8, wherein the query further specifies at least the first join key and the second join key.

15. A non-transitory computer-readable medium storing instructions, which when executed by at least one data processor, result in operations comprising:

receiving, by a calculation engine, a query to filter a set of data, the set of data being stored in a first table and a second table, the first table comprising a first attribute and a second attribute that is different from the first attribute, the second table comprising the first attribute and the second attribute, the first attribute of the first table corresponding to a first column, the first attribute of the second table corresponding to a second column; and joining the set of data contained in the first table and the second table on a join node comprising the at least one programmable processor, the join node comprising a plurality of join keys, the plurality of join keys comprising a first join key defining the first attribute and a second join key defining the second attribute, the joining comprising:

determining that the first table and the second table each include the first attribute and the second attribute;

determining that the first column of the first table and the second column of the second table each semantically contain a same set of data;

removing, based on the determination that the first table and the second table each include the first attribute and the second attribute and the determination that the first column of the first table and the second column of the second table each semantically contain the same set of data, the first join key from the join node, thereby reducing a total number of join keys of the plurality of join keys;

selecting, between the first attribute and the second attribute and based on the removal of the first join key from the join node, the first attribute for replacement;

replacing the first attribute corresponding to the first column of the first table with a third attribute that is different from each of the first attribute and the second attribute; and pairing the third attribute with the first attribute and storing pairing information comprising the paired third attribute and the first attribute on the join node; and providing a response to the query, the providing comprising using the joined set of data, the joined set of data comprising: the first column with the third attribute; and the second column with the first attribute, the first column and the second column semantically containing the same set of data.

16. The non-transitory computer-readable medium of claim 15, wherein the joining further comprises filtering the first table and the second table based on the first attribute using the pairing information stored on the join node.

17. The non-transitory computer-readable medium of claim 15, wherein the query specifies a filter to be applied to the set of data.

18. The non-transitory computer-readable medium of claim 15, wherein first attribute comprises one or more of a Product ID, an Order ID, a Customer ID, and a Customer Name, and the second attribute comprises one or more of the Customer ID, the Customer Name, and a Customer Address.

19. The non-transitory computer-readable medium of claim 15, wherein the first attribute and the second attribute are associated with separate columns of the first table and the second table.

20. The non-transitory computer-readable medium of claim 15, wherein the joining further comprises receiving an instruction to handle the third attribute as the first attribute for filter purposes, the instruction specifying the third attribute.

* * * * *